(12) United States Patent
Ladhari et al.

(10) Patent No.: US 10,538,176 B2
(45) Date of Patent: Jan. 21, 2020

(54) METHOD FOR MANAGING A LOAD SUPPLIED BY A CONVERTER THAT IS ITSELF SUPPLIED BY A BATTERY, AND CORRESPONDING SYSTEM

(71) Applicant: RENAULT s.a.s., Boulogne-Billancourt (FR)

(72) Inventors: Othman Ladhari, Fontaine (FR); Anh Linh Bui-Van, Saint Nizier du Moucherotte (FR)

(73) Assignee: RENAULT s.a.s., Boulogne-billancourt (FR)

( * ) Notice: Subject to any disclaimer, the term of this patent is extended or adjusted under 35 U.S.C. 154(b) by 242 days.

(21) Appl. No.: 14/899,414

(22) PCT Filed: Jun. 13, 2014

(86) PCT No.: PCT/FR2014/051457
§ 371 (c)(1),
(2) Date: Dec. 17, 2015

(87) PCT Pub. No.: WO2014/202879
PCT Pub. Date: Dec. 24, 2014

(65) Prior Publication Data
US 2016/0152148 A1 Jun. 2, 2016

(30) Foreign Application Priority Data
Jun. 18, 2013 (FR) .................................... 13 55711

(51) Int. Cl.
*B60L 58/18* (2019.01)
*B60L 50/60* (2019.01)
*H02M 7/44* (2006.01)

(52) U.S. Cl.
CPC ............... *B60L 58/18* (2019.02); *B60L 50/60* (2019.02); *B60L 50/66* (2019.02); *H02M 7/44* (2013.01);
(Continued)

(58) Field of Classification Search
CPC .............. B60L 11/1866; B60L 11/1861; B60L 11/1853; B60L 11/1855; B60L 11/1851;
(Continued)

(56) References Cited

U.S. PATENT DOCUMENTS 7,626,354 B2 * 12/2009 Hanyu ................... B60K 6/442
320/104
2010/0033135 A1 * 2/2010 Nishida ................. B60L 3/0046
320/136

(Continued)

OTHER PUBLICATIONS

International Search Report dated Sep. 19, 2014 in PCT/FR2014/051457 filed Jun. 13, 2014.

*Primary Examiner* — Ryan Johnson
(74) *Attorney, Agent, or Firm* — Oblon, McClelland, Maier & Neustadt, L.L.P.

(57) ABSTRACT

A method and system manages a load supplied by a converter that is supplied by a battery including modules that can be switched, a capacitor being placed between the battery and the converter. The method includes detecting a switching command, supplying, via the converter, a lower power to the load when the switching command is detected, carrying out the switching, and supplying, via the converter, a normal power to the load when the switching is carried out.

7 Claims, 2 Drawing Sheets

(52) U.S. Cl.
CPC ....... *B60L 2210/42* (2013.01); *B60L 2270/20* (2013.01)

(58) Field of Classification Search
CPC ...... B60L 2270/20; B60L 3/0046; B60L 3/04; H02J 7/0085; H02J 7/0016; Y02T 10/7005; Y02T 10/6278; B60W 10/26; H01M 2010/4271; H01M 2220/20; H02M 1/32

See application file for complete search history.

(56) References Cited

U.S. PATENT DOCUMENTS

| | | |
|---|---|---|
| 2011/0087395 A1 | 4/2011 | Yamamoto et al. |
| 2012/0139490 A1* | 6/2012 | Ishii .................. B60L 11/1816 320/109 |

* cited by examiner

METHOD FOR MANAGING A LOAD SUPPLIED BY A CONVERTER THAT IS ITSELF SUPPLIED BY A BATTERY, AND CORRESPONDING SYSTEM

BACKGROUND

The invention relates to systems equipped with batteries, in particular systems equipped with batteries formed by battery modules arranged in series, and in particular automobile vehicles with electric or hybrid drive.

In general, in these systems an electric converter is used for supplying a load with power from the direct current, which can be supplied by a battery. In particular used are converters such as inverters for supplying an electric motor with sinusoidal currents, three-phase currents for example. The converter and the motor form a powertrain.

The batteries can be composed of a plurality of battery modules arranged in series, and the modules can be independently placed in series or not, i.e. switched. In other words, according to the voltage desired to be supplied to the load, a greater or lesser number of battery modules is activated. The voltage at the terminals of a battery can therefore vary during the operation of a system.

Conventionally, a capacitor is placed between the battery and the load so as to smooth the high-frequency currents as well as the inrush currents absorbed by the converter. When the battery (i.e. the assembly of modules) is connected to the converter by means of relays, for example within a vehicle during startup, strong inrush currents occur and may damage the components, for example the capacitor, the relays used or even the power switches. Additionally, when the voltage at the terminals of the battery varies, currents can occur, as the battery and the capacitor both behave as voltage generators.

Furthermore, jerks generated by the motor can occur when the voltage varies at the terminals of the battery.

Consequently, the capacitor is generally charged so that the voltage at the terminals of this capacitor is equal to the voltage at the terminals of the battery after it has varied.

European patent application EP 2 361 799 may be referred to, which describes a system for increasing the voltage at the terminals of the capacitor before connecting the powertrain, i.e. a pre-charge system for the capacitor. This document in particular proposes the use of a resistor for forming an RC-type circuit for charging the capacitor. A drawback of this system is that it does not allow the capacitor to be charged completely, the duration of charging being too long. Another drawback of this system is the addition of a resistor in series to the system. This system can therefore only be used on startup of the vehicle on account of this resistor. It is therefore not suited to the activation or the deactivation of a battery module during the operation of the vehicle.

American patent application U.S. 2012/0025768 may also be referred to, which describes a system for pre-charging a capacitor comprising a resistor of low value, and an assembly of switches for improving the pre-charging of the capacitor. This system is also not usable during the operation of the vehicle.

International patent application WO 2009/077668 describes a pre-charge system for a capacitor in which a switch is connected in series with the capacitor, and this switch is controlled by a pulse-width modulation signal, the duty cycle of which varies. A drawback of this solution is that it increases the impedance of the branch comprising the capacitor.

Lastly, French patent application FR 2 923 962 may be referred to, which describes a system for pre-charging a capacitor using a boost-type power converter, but which also has the drawback that it increases the impedance of the branch comprising the capacitor. It is hence impossible to use this system during the operation of the vehicle on account of overly large losses caused by the increase in the impedance.

BRIEF SUMMARY

An object of the invention is therefore to limit the occurrence of high currents, sometimes known as overcurrents, when switching modules of the battery, and to prevent jerks which can occur during these switchings.

According to a first embodiment, a subject of the invention is a method for managing a load supplied by a converter that is itself supplied by a battery comprising modules that can be switched, a capacitor placed between the battery and the converter.

According to a general feature of the method:
a switching command is detected,
if a switching command is detected, the converter supplies a low power to the load,
the switching is carried out,
if the switching is carried out, the converter supplies a normal power to the load.

By normal power is in particular understood a power which is not limited, and which, for example for an automobile vehicle, corresponds to the driver's desired command. In other words, when the converter supplies a normal power to the load, a low power is no longer supplied to the load, unless the converter was already intended to operate at low power (vehicle moving at low speed).

A battery comprising modules that can be switched is a battery in which additional modules can, at any moment, be put in series or even be disconnected. These switchings are, by way of indication, controlled by a battery management system (BMS). These switchings can be implemented at any moment, by way of example, within a vehicle, they can be implemented while the vehicle is moving, while charging, or even during a regenerative braking phase.

When a switching command is applied, the voltage at the terminals of the battery varies, and the inventors have observed that it is particularly advantageous to control the converter so that it can supply a low power to the load in order to prevent overcurrents and avoid the occurrence of jerks. By supplying a low power to the load, the quantity of current which can flow up to the load while simultaneously charging the capacitor is limited. After having implemented the switching corresponding to the switching command, a normal power, which is not limited, can be supplied.

Furthermore, the converter can supply a zero power to the load.

A plurality of switches of said converter can be opened so as to supply a zero power to the load, for example all of the switches of an inverter.

In a variant, a switch placed between the capacitor and the converter can be opened so as to supply a zero power to the load. This switch can subsequently be closed on completion of charging the capacitor so as to allow normal operation of the system.

The load can be an electric machine of an automobile vehicle powertrain with electric or hybrid drive.

According to another aspect, a subject of the invention is a system for managing a load supplied by a converter that is itself supplied by a battery comprising modules that can be switched, a capacitor being placed between the battery and the converter.

According to a general feature of this aspect, the system comprises:

means configured for detecting a switching command (9), and means configured for supplying a low power to the load and controlled by said means configured for detecting a switching command (11, 12, 15).

Said means configured for supplying a low power to the load can be configured for supplying a zero power to the load.

Said means configured for supplying a low power to the load are configured for supplying a zero power to the load and comprise means configured for opening a plurality of switches of said converter.

The system can furthermore comprise a switch placed between the capacitor and the converter.

According to yet another aspect, a subject of the invention is an automobile vehicle with electric or hybrid drive comprising an electric machine of a powertrain forming said load and comprising said system.

BRIEF DESCRIPTION OF THE DRAWINGS

Other aims, features and advantages will become apparent upon reading the following description given solely by way of non-limiting example and made in reference to the appended drawings in which.

DETAILED DESCRIPTION

Figure 1:
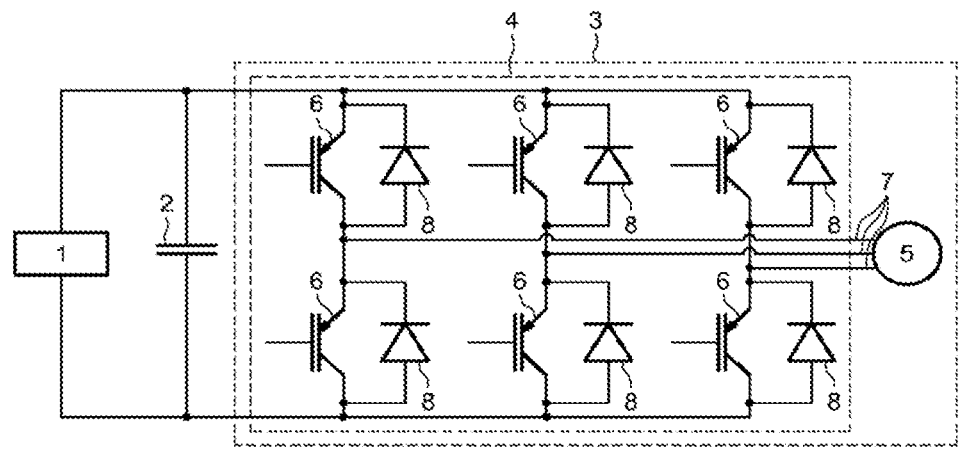
FIG. 1 diagrammatically shows a system according to the prior art.

In FIG. 1, a system for managing a load according to the prior art is shown diagrammatically. This system can be integrated within an automobile vehicle with electric or hybrid drive.

This system comprises a battery 1, comprising, for example, a plurality of battery modules which can be connected in series so as to obtain a voltage at the terminals of the battery equal to the sum of the voltages at the terminals of each of the connected modules. The modules of this battery can be switched.

The system also comprises a capacitor 2, the two plates of which are linked to the positive and negative terminals of the battery 1. It is the capacitor 2 that is pre-charged in the solutions of the prior art so as to protect it and the other components, for example while starting up the vehicle (connection of the battery 1) or while connecting or switching a battery module.

The capacitor 2 is also linked to a powertrain 3 comprising a converter 4, here an inverter, and a load 5, here a three-phase motor comprising mechanical parts which may be damaged on the occurrence of overly high currents during the connection of the battery or of a battery module. The inverter stage 4 comprises a plurality of switches 6, here insulated-gate bipolar transistors intended to control the load 5 with three-phase currents on three connections 7. A diode 8 is connected in parallel with each switch 6.

Figure 2:
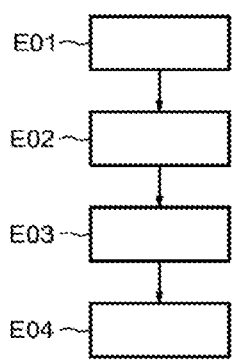
FIG. 2 diagrammatically shows various steps of a method according to one mode of implementing the invention, FIGS. 3 and 4 diagrammatically show two variant embodiments of the invention.

FIG. 2 diagrammatically shows the steps of a method for managing a load according to the invention, for example an electric motor, supplied by a converter, for example an inverter 4 which is supplied by a battery comprising modules that can be switched, for example a battery 1.

In a first step E01, a switching command is detected, for example a command issued by a BMS-type system, or any other system able to control the switching of the battery modules.

If such a command is detected, the step E02 can be implemented in which the converter supplies a low power to the load (E02). The converter can also supply a zero power to the load, for example by opening one or more switches so as to prevent the flow of the courant toward the load.

It may be noted that it is possible, before limiting the power totally or applying a zero power, to reduce in a progressive manner the power to be supplied. By way of example, the low (or zero) power can be applied once a current threshold has been crossed. For this purpose, means configured for measuring the current can be used.

It is subsequently possible to implement the switching (E03) without observing the occurrence of currents or overcurrents.

The duration of the switching of one or more modules can be ascertained, this duration generally being fixed. It will advantageously be possible to choose a long switching duration, in particular longer than the duration of the slaving of the converter. A switching is thereby obtained which is imperceptible to the driver of a vehicle as it produces no jerks.

Additionally, the duration over which a low power is supplied to the load is longer than the duration required for implementing a switching. Nevertheless, this duration is sufficiently short as to be imperceptible to the driver. Components should therefore be used that are sufficiently rapid to implement the step E02 without a driver of the vehicle being able to notice that the powertrain is operating in a limited manner or is disconnected.

After the switching, a normal power can be supplied to the load (step E04).

Figure 3:
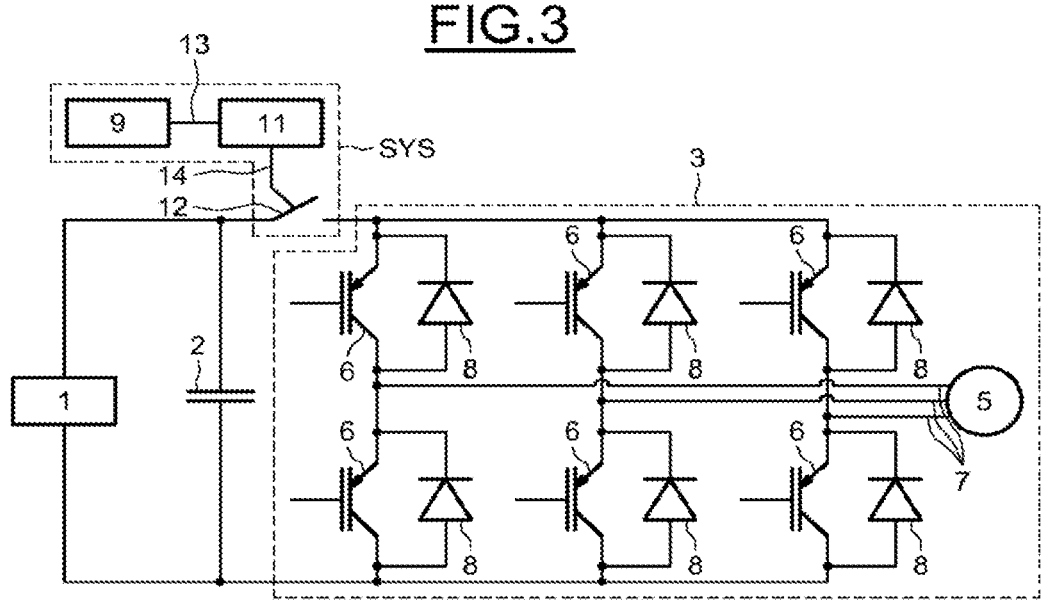

FIG. 3 shows a system SYS for managing a load 5, here an electric motor, supplied by a converter 4, here an inverter. The elements bearing the same reference numbers are identical to those in FIG. 1.

The system SYS can be integrated within a vehicle computer, for example within an electronic control unit. The system SYS comprises means 9 configured for detecting a switching command. The means 9 can implement the step E01 described with reference to FIG. 2.

Furthermore, the system SYS comprises means 11 configured for controlling a switch 12 and for implementing the step E02, in which a zero power is here supplied to the load because the power supply of the converter is cut by opening the switch. The means 11 for controlling the switch communicate with the means 9 by means of an electrical connection 13, and the means for controlling the switch control the switch by means of an electrical connection 14.

The switch 12 is controlled so as to be opened when a switching command is detected, the capacitor 2 can thereby be charged without supplying power to the load. When the capacitor 2 is charged and switching has been carried out, the switch 12 can be closed so as to allow normal operation of the powertrain 3 (step E04).

The embodiment described with reference to FIG. 3 makes it possible to isolate the powertrain completely as soon as a switching command is detected. It may be noted that while using the vehicle, the motor then operates in freewheel as soon as the switch 12 is opened.

The embodiment described with reference to FIG. 4 differs from that described with reference to FIG. 3 in that the powertrain 3 is not completely isolated from the battery and from the capacitor during a variation of voltage at the terminals of the battery 1.

Figure 4:
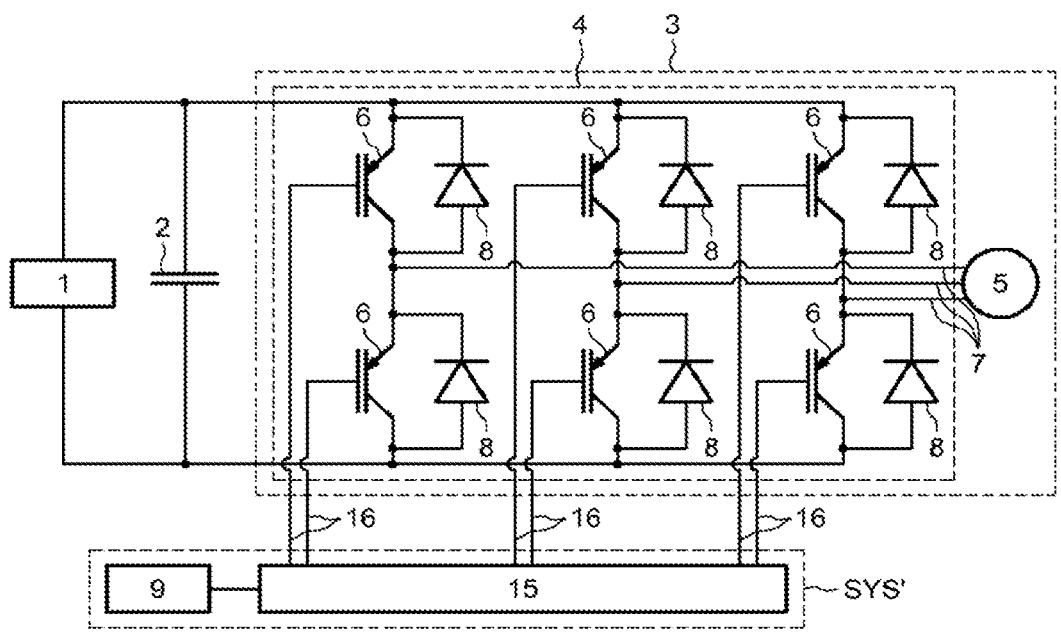

In FIG. 4, a system SYS' is shown in which the means 9 can control means configured for controlling the switches 6 of the converter 4. An assembly of electrical connections 16 makes it possible to control the switches 6.

Upon detecting a switching command, all of the switches 6 can be opened, or, in a variant, a very low power can be supplied to the motor 5, i.e. a very low torque setpoint. The quantity of current flowing toward the motor while charging the capacitor 2 is thereby limited.

The system SYS' can be integrated within a computer already present in the vehicle, for example the computer controlling the converter 4.

By virtue of the invention, the current spikes which can occur when switching battery modules are greatly reduced. Furthermore, an advantage of the invention is the use of a reduced number of additional components, and it is therefore advantageously inexpensive.

The invention claimed is:

1. A method for managing a load supplied by a converter that is supplied by a battery comprising modules that can be switched, a capacitor being placed between the battery and the converter, comprising:
   detecting a switching command;
   supplying, via the converter, a lower power to the load when the switching command is detected;
   carrying out the switching;
   supplying, via the converter, a normal power to the load when the switching is carried out,
   in which the converter supplied by the battery is the only converter supplying the load, and
   in which a switch placed between the capacitor and the converter is opened so as to supply a zero power to the load.

2. The method as claimed in claim 1, in which a plurality of switches of said converter are opened so as to supply a zero power to the load.

3. The method as claimed in claim 1, in which the load is an electric machine of an automobile vehicle powertrain with electric or hybrid drive.

4. A system for managing a load supplied by a converter that is supplied by a battery comprising modules that can be switched, a capacitor placed between the battery and the converter, comprising:
   means for detecting a switching command; and
   means for supplying a low power to the load which are controlled by said means for detecting a switching command, said means for supplying a low power to the load being configured for supplying a zero power to the load; and
   a switch placed between the capacitor and the converter.

5. The system as claimed in claim 4, in which said means for supplying a low power to the load comprise means for opening a plurality of switches of said converter.

6. An automobile vehicle, comprising:
   an electric or hybrid drive comprising an electric machine of a powertrain forming a load; and
   the system as claimed in claim 4.

7. A method for managing a load supplied by a converter that is supplied by a battery comprising modules that can be switched, a capacitor being paced between the battery and the converter, comprising:
   detecting a switching command;
   supplying, via the converter, a lower power to the load when the switching command is detected;
   carrying out the switching;
   supplying, via the converter, a normal power to the load when the switching is carried out,
   in which the converter supplies a zero power to the load, and
   in which a switch placed between the capacitor and the converter is opened so as to supply a zero power to the load.

* * * * *

UNITED STATES PATENT AND TRADEMARK OFFICE
CERTIFICATE OF CORRECTION

PATENT NO. : 10,538,176 B2
APPLICATION NO. : 14/899414
DATED : January 21, 2020
INVENTOR(S) : Othman Ladhari et al.

Page 1 of 1

It is certified that error appears in the above-identified patent and that said Letters Patent is hereby corrected as shown below:

In the Claims

Column 6, Line 26, Claim 7, delete "paced" and insert -- placed --.

Signed and Sealed this
Ninth Day of June, 2020

Andrei Iancu
*Director of the United States Patent and Trademark Office*